(12) United States Patent
Smith et al.

(10) Patent No.: US 7,814,097 B2
(45) Date of Patent: Oct. 12, 2010

(54) DISCOVERING ALTERNATIVE SPELLINGS THROUGH CO-OCCURRENCE

(75) Inventors: Michael Smith, San Diego, CA (US); Michael J. Wilkens, Sunnyvale, CA (US); Deepa Joshi, Santa Clara, CA (US); Kalpana Ravinarayanan, Sunnyvale, CA (US); Michael Mathieson, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 932 days.

(21) Appl. No.: 11/370,314

(22) Filed: Mar. 7, 2006

(65) Prior Publication Data

US 2007/0214128 A1 Sep. 13, 2007

(51) Int. Cl.
*G06F 7/20* (2006.01)
*G06F 17/27* (2006.01)
(52) U.S. Cl. .................. 707/723; 707/713; 707/748
(58) Field of Classification Search .............. 707/4, 707/5, 3, 999.003, 999.004, 999.005, 713, 707/723, 748
See application file for complete search history.

(56) References Cited

U.S. PATENT DOCUMENTS

| | | | |
|---|---|---|---|
| 6,144,958 A * | 11/2000 | Ortega et al. ............. | 707/5 |
| 6,401,084 B1 | 6/2002 | Ortega et al. | |
| 6,411,950 B1 | 6/2002 | Moricz et al. | |
| 6,701,309 B1 * | 3/2004 | Beeferman et al. ........... | 707/3 |
| 6,772,150 B1 | 8/2004 | Whitman et al. | |
| 7,117,207 B1 | 10/2006 | Kerschberg et al. | |
| 7,194,684 B1 * | 3/2007 | Shazeer ................ | 715/205 |
| 7,296,019 B1 * | 11/2007 | Chandrasekar et al. ...... | 707/6 |
| 7,321,892 B2 * | 1/2008 | Vadon et al. ............ | 707/4 |
| 2002/0194229 A1 | 12/2002 | Decime et al. | |
| 2004/0002994 A1 | 1/2004 | Brill et al. | |

(Continued)

OTHER PUBLICATIONS

Tabke, Brett, "The Google FAQ by Webmasters for Webmasters", http://referencementweb.hautetfort.com/files/google_kbase.pdf, Apr. 2002, 32 pages.

Bookface-GA, "Search Term Suggestion Tool Available", http://answers.google.com/answers/threadview?id=18072, May 2002, 2 pages.

(Continued)

*Primary Examiner*—James Trujillo
*Assistant Examiner*—Bruce M Moser
(74) *Attorney, Agent, or Firm*—Hickman Palermo Truong & Becker LLP; Christian A. Nicholes

(57) ABSTRACT

A search query that includes a first spelling of a term is received. A second spelling of the term is generated. A first set of items that are associated with the first spelling of the term is accessed, and a second set of items that are associated with the second spelling of the term is accessed. A comparison is performed between the first set to the second set. A determination is made as to how to respond to the search query based, at least in part, on the comparison. The response may include a suggested search query that includes the second spelling of the term. The second spelling may be a suggested spelling correction or an alternative spelling. The response may include search results that are relevant to a search query that includes the first spelling of the term, the second spelling, or both the first and second spelling.

32 Claims, 5 Drawing Sheets

U.S. PATENT DOCUMENTS

| | | |
|---|---|---|
| 2004/0199498 A1 | 10/2004 | Kapur et al. |
| 2004/0249801 A1 | 12/2004 | Kapur |
| 2005/0080795 A1 | 4/2005 | Kapur et al. |
| 2005/0160080 A1* | 7/2005 | Dawson ................. 707/3 |
| 2006/0161520 A1* | 7/2006 | Brewer et al. ........... 707/3 |
| 2006/0294067 A1* | 12/2006 | Halcrow et al. ......... 707/3 |
| 2007/0078828 A1 | 4/2007 | Parikh et al. |
| 2008/0104037 A1 | 5/2008 | Biemer |
| 2008/0120276 A1 | 5/2008 | Chennavasin |
| 2008/0208825 A1 | 8/2008 | Curtis et al. |

OTHER PUBLICATIONS

Cuppens et al., "Cooperative Answering: a methodology to provide intelligent access to databases", Proceedings $2^{nd}$ International conference on Expert Database Systems, 1989, 21 pages.

Han et al., "Intelligent Query Answering by Knowledge Discovery Techniques", IEEE Transactions on knowledge and data engineering, vol. 8, No. 3, Jun. 1996, 18 pages.

Liu et al., "Personalized Web Search for Improving Retrieval Effectiveness", IEEE Transactions on knowledge and data engineering, 2004, 35 pages.

* cited by examiner

FIG. 3A

| first spelling | associated items | Strength |
|---|---|---|
| 401(k) | retirement | 1000 |
| | plans | 984 |
| | guide | 252 |
| | help | 112 |
| | calculator | 57 |

FIG. 3B

| second spelling | associated items | Strength |
|---|---|---|
| 401k | retirement | 989 |
| | plans | 1000 |
| | guide | 275 |
| | help | 125 |
| | calculator | 65 |

FIG. 3C

| third spelling | associated items | Strength |
|---|---|---|
| 401-k | retirement | 125 |
| | plans | 78 |
| | guide | 25 |
| | calculator | 3 |

FIG. 4A

| first spelling | associated items | Strength |
|---|---|---|
| Britny Spears | music | 654 |
| | biography | 425 |
| | records | 152 |
| | concert | 112 |
| | lyrics | 65 |

FIG. 4B

| second spelling | associated items | Strength |
|---|---|---|
| Britney Spears | music | 10,000 |
| | biography | 9845 |
| | records | 2525 |
| | concert | 1512 |
| | lyrics | 457 |

FIG. 5A

| first spelling | associated items | Strength |
|---|---|---|
| Kentwood | city | 798 |
| | public schools | 425 |
| | news | 152 |
| | Louisiana | 151 |
| | Michigan | 135 |

FIG. 5B

| second spelling | associated items | Strength |
|---|---|---|
| Kenwood | corporation | 654 |
| | vineyards | 425 |
| | electronics | 152 |
| | car audio | 112 |
| | car stereo | 65 |

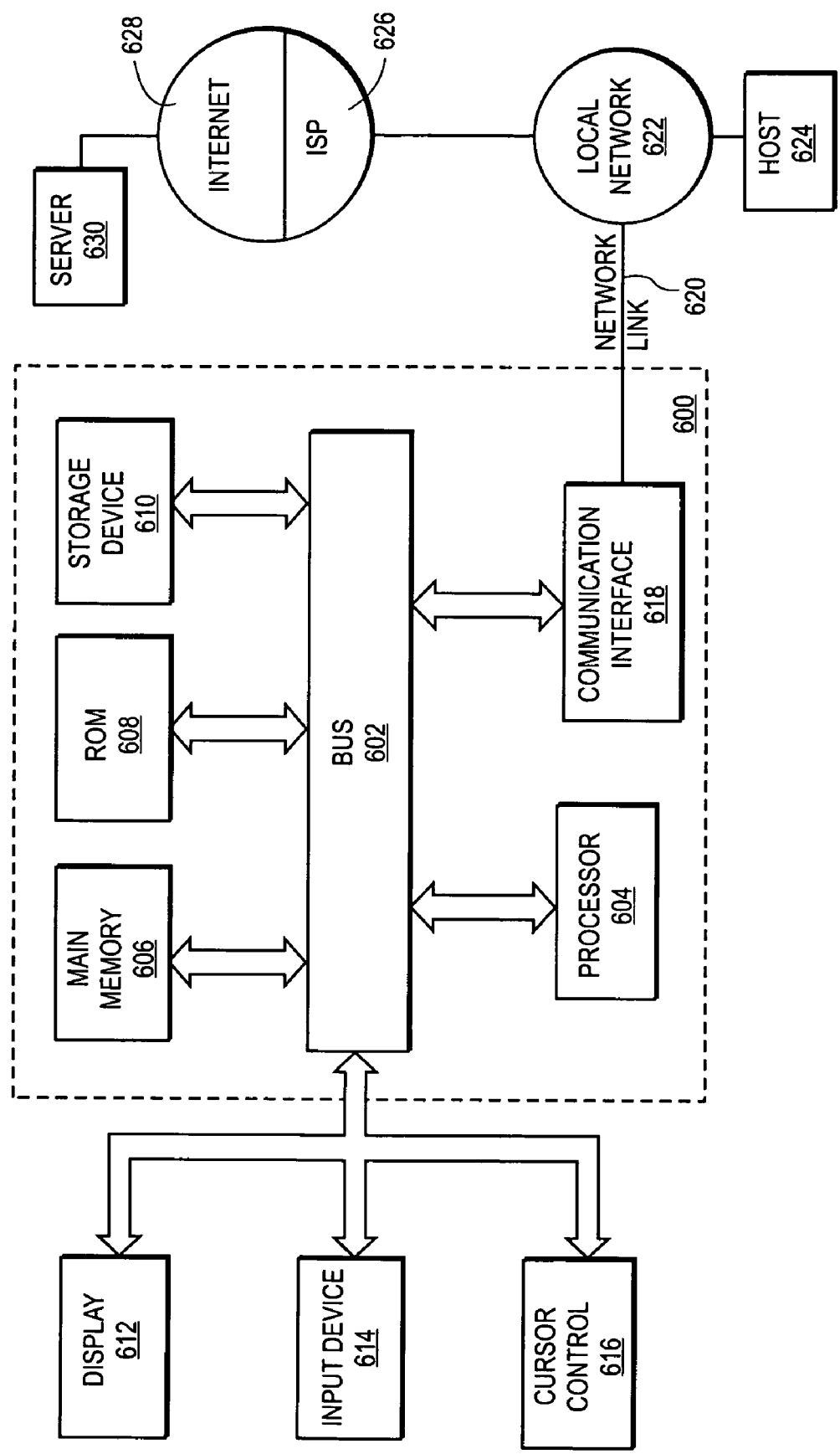

DISCOVERING ALTERNATIVE SPELLINGS THROUGH CO-OCCURRENCE

FIELD OF THE INVENTION

The present invention relates to search engines, and in particular, to determining the relative suitability of alternative spellings for use in a search query.

BACKGROUND

A search engine is a computer program that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Some search engines order a list of files before presenting the list to a user. To aid the user in the search, a search engine may rank the files according to relevance. Relevance is a measure of how closely the subject matter of the file matches query terms. When the list is sorted by rank, a file with a relatively higher rank may be placed closer to the head of the list than a file with a relatively lower rank. The user, when presented with the sorted list, sees the most highly ranked files first.

To find the most relevant files, search engines typically try to select, from among a plurality of files, files that include many or all of the words that a user entered into a search request. If the user has misspelled a word in the search request, then the search engine may fail to select files in which the correctly spelled word occurs.

If a search engine determines that a term in a search query may be misspelled, the search engine may present the user with an alternative search query that includes a different spelling for the term. In many cases, the alternative search query will provide better results than the original search query. However, sometimes the search engine suggests an alternative search query that would not produce suitable search results.

At best, presenting the user with an unsuitable spelling suggestion in an alternative search query is merely an annoyance to the user. Even if the user ignores the alternative search query, the user's time is taken to analyze the alternative search query to decide whether to submit it. However, it may be difficult for the user to tell whether the alternative search query will lead to an acceptable search result without trying the search query. If the user does submit the inappropriate alternative search query, the user's time is wasted waiting for and examining the alternative search results.

In other cases, a user may enter a search request containing a correctly spelled word that does not mean the thing for which the user desires to search. Because there are no incorrectly spelled words in the search request, the search engine may fail to even attempt to determine an alternative spelling. For example, a user who wants to find files that include information about "Silicon Valley" may request a search for "Silicone Valley." Because "Silicone" is a correctly spelled word, a search engine may not detect any error. Under such circumstances, the user is likely to obtain a list of results that have little to do with what the user was actually looking for.

Thus, there is a need for improved ways of suggesting alternative formulations to search queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A, FIG. 3B, FIG. 3C, FIG. 4A, FIG. 4B, FIG. 5A, and FIG. 5B are diagrams illustrating tables of items associated with alternative spellings, in accordance with an embodiment of the present invention; and FIG. 6 is a block diagram that illustrates a computer system upon which an embodiment of the invention may be implemented.

DETAILED DESCRIPTION

Figure 1:
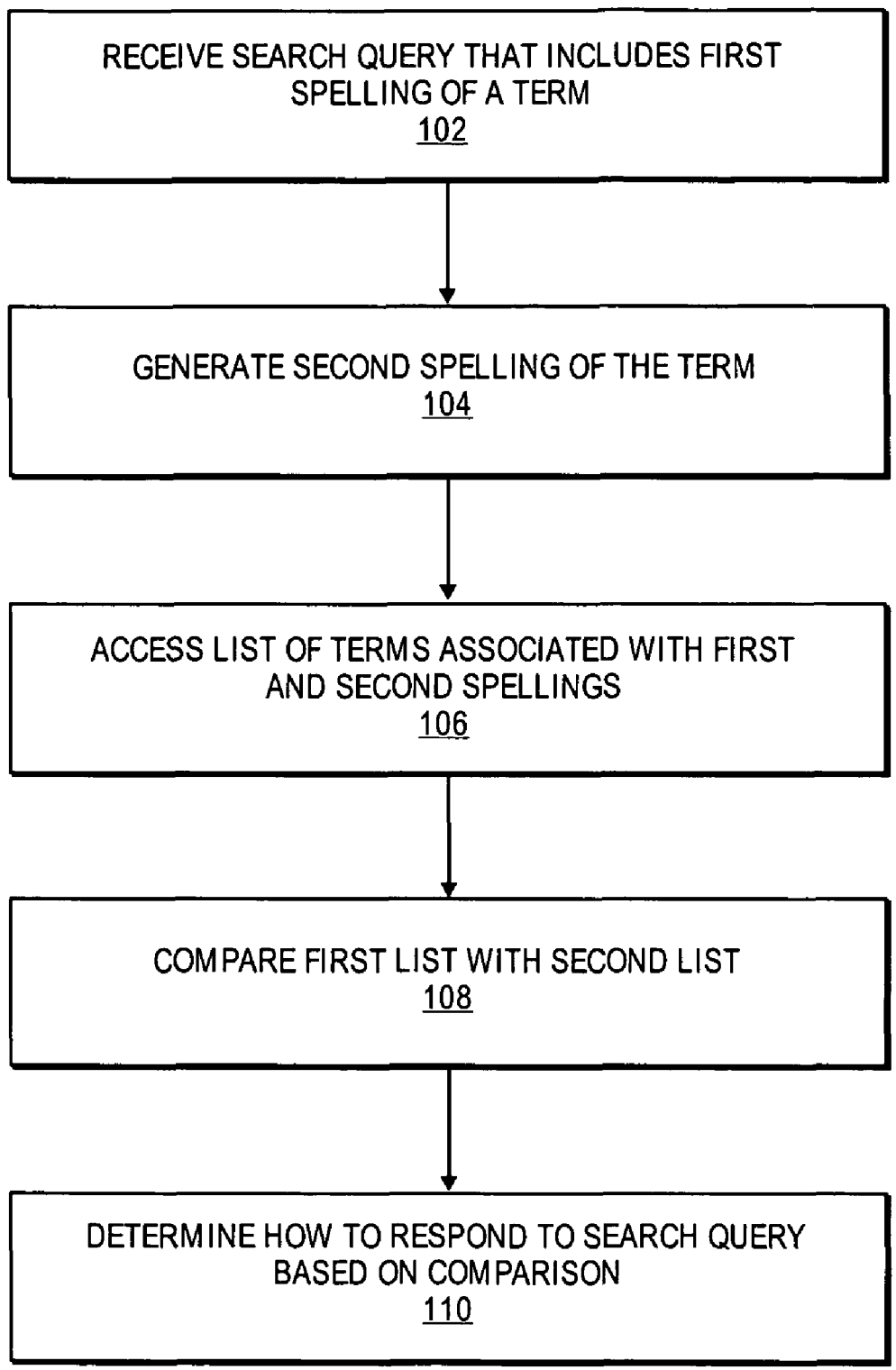
FIG. 1 is a flowchart illustrating steps of a process of determining how to respond to a search query, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An embodiment of the present invention is a method including the following steps. A search query that includes a first spelling of a term is received. A second spelling of the term is generated. A first set of items that are associated with the first spelling of the term is accessed, and a second set of items that are associated with the second spelling of the term is accessed. A comparison is performed between the first set and the second set. A determination is made as to how to respond to the search query based, at least in part, on the comparison.

The response may include a suggested search query that includes the second spelling of the term. The second spelling may be a suggested spelling correction or an alternative spelling. For example, if the user enters a search query with "Silcon," a suggested spelling correction of "Silicon" might be presented. If the user enters a search query with "super bowl" an alternative spelling of "Superbowl" might be presented.

The response may include search results that are relevant to a search query that includes the first spelling of the term. Alternatively, the response may include search results that are relevant to a search query that includes the second spelling of the term. For example, if the user enters "Silcon Valley" the response can be to return search results that are relevant to the corrected query "Silicon Valley." In this case, the response may also include an indication that the search query has been automatically corrected. The response may include search results that are relevant to a search query that includes both the first and second spelling of the term. For example, a response to a search query including "401(k)" can include results that are relevant to a search query including "401(k)," as well as results that are relevant to a search query including "401-k." The results can be based on an additional alternative as well, such as "401 k."

In one embodiment, the determination of how to respond to the search query is stored, such that the determination may be used to improve various tools that depend on the spelling of terms. For example, a determination that one spelling of a term is more suitable than another spelling for use in a search query can be used to improve a spelling suggestion tool. Other tools, such as those that determine conceptual relationships between different terms can be improved as well. For example, a tool that determines that a first term is conceptually related to second term can benefit from receiving input that one spelling is more suitable than another spelling for use in a search query.

Examples are provided in this description in which the language is the English language; however, it will be understood that the concepts described herein are applicable to other languages.

In other aspects, the invention encompasses a machine-executed operation involving instructions to carry out one or more of the foregoing steps. The machine-executed operation is at least one of:

A) sending the instructions over transmission media;
B) receiving the instructions over transmission media;
C) storing the instructions onto a machine-readable storage medium; and
D) executing the instructions.

Search Terms

Search queries typically include one or more terms that are used in a search. As used herein, a "term" may be one or more words that occurs in a natural language, such as English, or one or more special notations, such as a product code, URL, or ISBN. For example, a search term might be "municipal" or "New York" or "yahoo.com" or "IBM AS400." The search term may be in languages other than English.

Alternative Spellings

The form in which a search term is provided by a user is considered one "spelling" of the search term. An alternative spelling of a search term is one or more words, other than the user-provided spelling of the search term, which may reflect the concept the user wanted to convey by a search term.

In its simplest form, an alternative spelling may simply be the correct spelling of a misspelled word. For example, the term "http:" is often misspelled as "htpp:", so "http:" may be an alternative spelling of "htpp:".

However, an alternative spelling for a search term may also be something other than a different spelling of the same word. For example, "Silicon" is an entirely different word than "Silicone." However, "Silicon" may still be considered an alternative spelling for the search term "Silicone" because "Silicon" may reflect the concept that the user actually wanted to convey by the search term Silicone.

Associating Items with Spellings

Search terms have words, phrases, or special notations associated with them. Herein, the words, phrases, or special notations associated with search terms are referred to as "associated items." Thus, as used herein, an "item" may be one or more words that occurs in a natural language, such as English, or one or more special notations, such as a product code, URL, or ISBN. As an example, FIG. 3A has a first spelling of a search term "401(k)" and associated items such as "retirement," "plans," "guide," "help," and "calculator." FIG. 3B and FIG. 3C illustrate tables with a second spelling (401 k) and a third spelling (401-k), along with lists of associated items.

The set of items that are associated with a first spelling of a term are sometimes quite different the set associated with a different spelling. Referring to FIG. 5A, the first spelling "Kentwood" has associated with it the items "city," "public schools" "news" "Louisiana" and Michigan" Referring to FIG. 5B, the second spelling "Kenwood" has associated with it the items "corporation", "vineyards" "electronics" "car audio" and "car stereo."

Referring again to FIG. 3A, FIG. 3B, and FIG. 3C, each item in the associated lists has a strength of association that defines how closely the item is associated with the spelling of the term. For example, the term "retirement" has a relatively strong association with the first spelling "401(k) and the second spelling "401 k," but has a weaker association with the spelling "401-k". In one embodiment, the strength of association is based on how frequently the item is associated with the spelling of the term in web pages, search queries, or other electronic files.

The lists of associated items can be accessed from a file that stores associations between terms and items. Determining what items to associate with the spelling of a term can be based on a number of factors and performed in a number of ways including, but not limited to, analysis of related terms in search queries, web pages, and electronic documents. Various techniques for determining lists associating items with terms are discussed herein below.

General Flow

FIG. 1 is a flowchart illustrating steps of a process of determining how to respond to a search query, in accordance with an embodiment of the present invention. FIG. 1 will be discussed in conjunction with FIG. 4A, FIG. 4B, FIG. 5A and FIG. 5B. In step 102, a search query is received that includes a first spelling of a term. The request may be to search for files that contain several specific words. The files that are considered during the search may include one or more pages that are accessible through the Internet. For example, an Internet search engine may receive, from a user, a request to search for pages that contain the word "Kentwood."

In step 104, a second spelling of the term is generated. Thus, if the search included the term "Kentwood," step 104 may involve generating the spelling "Kenwood."

In step 106, a first set of items that are associated with the first spelling of the term is accessed, and a second set of items that are associated with the second spelling of the term is accessed. For example, the set of items in FIG. 5A and FIG. 5B are accessed from a file that stores terms and associated items.

In step 108, a comparison is performed between the first set of associated items and the second set. In one embodiment, the comparison is based on a degree to which the items in the first set correlate to items in the second set. For example, referring to FIG. 5A and FIG. 5B, there is a low degree of overlap between the items associated with "Kentwood" and the items associated with "Kenwood."

In one embodiment, the comparison of step 108 is between (1) a strength with which the first set of items are associated with the first spelling of the term, and (2) a strength with which the second set of items are associated with the second spelling of the term. For example, referring to FIG. 4A and FIG. 4B, there is a relatively strong association between "Britney Spears and its associated items and a relatively weak association between "Britney Spears" and its associated items. The comparison may be based on additional factors.

In step 110, a determination is made as to how to respond to the search query based, at least in part, on the comparison of Step 108. Step 110 may further include determining a relative suitability between the first spelling of the term and the second spelling of the term for use as search terms, further details of which are described herein in FIG. 2 and associated description.

The first spelling of the term could be determined to be more suitable for a search query than the second spelling of the term. For example, if the user entered the term "Kentwood" then the term "Kenwood" might be considered as an alternative but rejected. In this case, the second term would not be used to respond to the search query.

Alternatively, the second spelling of the term could be determined to be more suitable for use in a search query than the first spelling of the term. For example, the spelling "Britney Spears" could be determined to be more suitable than the spelling "Britney Spears." In this case, the second term could be used to respond to the search query.

When the second spelling of the term is used in the response, the response to the search query can include providing a suggested search query that includes a spelling change suggestion related to the second spelling. Rather than providing a suggested alternate search query, the response could include providing a search result that is based on the suggestion related to the second spelling.

It is also possible to determine that the first and second spellings of the term are both suitable for use in the search query. In this case, the response can be a suggestion to also try a search based on the second spelling of the term. For example, an alternative search of "Super Bowl" can be suggested in the search query "Superbowl." Alternatively, the response could be to include search results based on both the first and the second spellings of the term. Thus, results for both "Super Bowl" and "Superbowl" may be returned for the query "Superbowl."

Determining a Second Spelling of a Term

The second spelling of the term may be selected based on a set of factors. The set of factors may include how frequently the second spelling occurs in a plurality of files. The set of factors may include how frequently the second spelling occurs in one or more previously received requests to search for files. The second spelling may be similar to the corresponding part of the original query for which the second spelling is selected. For example, the second spelling may be spelled similarly to the corresponding part of the original query. For another example, the second spelling may be pronounced similarly to the corresponding part of the original query. For yet another example, the second spelling may be synonymous to the corresponding part of the original query. The second spelling may be selected from among a set of candidate alternative spellings. While in one embodiment, only one second spelling is selected, in an alternative embodiment, additional spellings may be selected. Furthermore, multiple terms may be selected as a second spelling of a single term, and vice-versa. In other words, terms in spellings may be split or joined. For example, the spelling "New York" may be selected as an alternative to the spelling "Newyork."

In one embodiment, a search engine may submit the search query to a spell checking routine. In response, the spell checking routine may consult a stored dictionary file of spellings and return one or more alternative spellings that are spelled similarly to, but not exactly the same as, the submitted search query. The search engine may then determine how frequently one or more words from each alternative spelling occurs in the Internet pages. In making this determination, the search engine may consult a pre-generated index of spellings that indicates, for each spelling, how frequently that spelling occurs in a set of Internet pages that has been analyzed for spelling frequency. The more frequently an alternative spelling occurs in the set of Internet pages, the more likely it is that the alternative spelling would produce search results in accord with the interests of the user who requested the search.

The search engine may also, or instead, determine how frequently each alternative spelling occurs in one or more previously received requests to search the set of Internet pages. In making this determination, the search engine may consult a log of search requests that the search engine has previously received. The log may include each spelling of each previously entered search query. Some spellings may occur more frequently in the log than other spellings. Alternatively, the search engine may consult an index that indicates, for each spelling that occurs in the log, how frequently that spelling occurs in the log. The more frequently an alternative spelling occurs in the log, the more likely it is that the alternative spelling would produce search results in accord with the interests of the user who requested the search.

While in one embodiment, both of the factors described above are used to select an alternative spelling, in other embodiments, only one or the other of these factors is used to select an alternative spelling.

Before consulting a full index of spellings to determine the frequency of an occurrence of a spelling in a plurality of files or previously received search requests, a search engine may consult a cache. The cache may contain a subset of spellings (with associated frequencies) from the full index that are most often searched for, or most recently searched for, in the full index. If a spelling is not contained in the cache, then the search engine may consult the full index.

Figure 2:
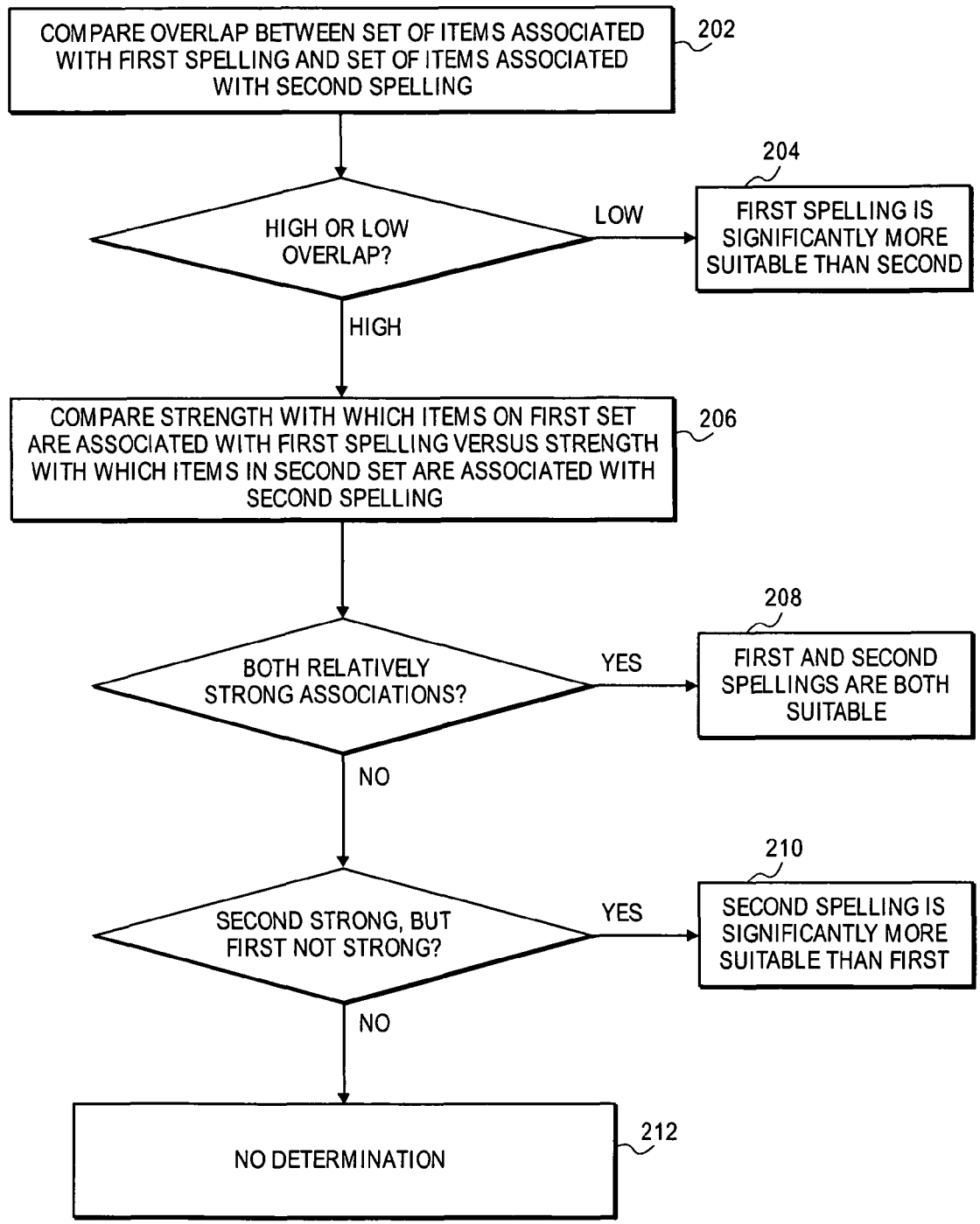
FIG. 2 is flowchart illustrating steps of a process of determining a relative suitability for use in a search query between a first and a second spelling of a term, in accordance with an embodiment of the present invention.

Determining a Relative Suitability Between a First and a Second Spelling of a Term for Use in a Search Query FIG. 2 is a flowchart illustrating steps of a process of determining a relative suitability for use in a search query between a first and a second spelling of a term, in accordance with an embodiment of the present invention. In step 202, a comparison is made of the degree of overlap between the set of items associated with the first spelling and set of items associated with the second spelling. The degree of overlap may be based on how many items in the first list match items in the second list. Another factor that may be considered is the relative ranking of the matching items in the respective lists. For example, if the items in each list are ranked based on how strongly an item is associated with the spelling of the term, then more weight can be placed for a match involving an item near the top of the ranking of at least one of the lists.

If there is a relatively low degree of overlap between items associated with the first and second spellings of the term, then control is transferred to step 204. For example, referring to FIG. 5A and FIG. 5B, there is low degree of overlap between the items associated with "Kentwood" and "Kenwood." The term "Kentwood" is associated with terms such as, "city" and "public schools" because Kentwood is a city in both Louisiana and Michigan. However, the term "Kenwood" is associated with terms such as "corporation" and electronics." In this case, both terms are valid spellings, but are not conceptually related.

In step 204, the determination is that the first spelling of the term is more suitable for use in a search query than the second spelling. Thus, the second spelling would not be used in the result to the search query containing the first spelling. For example, whether the user entered a search request with "Kentwood" or with Kenwood" the other spelling is not used in the response to the search query because both words are suitable spellings for search queries.

If there is a relatively high degree of overlap between the items associated with the first spelling and the items associated with the second spelling of the term, then control passes to step 206.

In step 206, the strength of the association between the first spelling and its associated items is compared with the strength of the association between the second spelling and its associated items. This determination may be based on a set of one or more rules that compare the relative strength of association. A search engine administrator may construct such rules and store the rules in a set of rules that the search engine applies when evaluating candidate alternative spellings.

The strength of association may be based on the frequency with which items are associated with a spelling of the term, but it is not limited to frequency. For example, if a user re-formulates a search query, this may imply a stronger association between the reformatted spelling of a term and an associated item in the query than the original formulation of the term and the associated item. Further, a strength of association may be based on how frequently users accept a suggested spelling suggestion. Also, how closely the associated item appears to the spelling of the term may suggest a strength of association. In one embodiment, a pre-generated index contains the strength of association. The index may be adjusted after each new search request.

If there is a relatively strong association between both the items in the first set with the first spelling of the term and the item in the second set with the second spelling of the term, then control passes to step 208. In step 208, the determination is that both the first spelling and the second spelling are suitable for use in a search query. A relatively strong association suggests that the spelling is valid for a term in a search query. For example, referring to FIG. 3A and FIG. 3B, consider the case in which the first spelling is "401(k)" and the second spelling is "401 k." An analysis of the strength of association between the items may lead to the determination that both "401(k)" and "401 k" are suitable spellings for a search term. In contrast, referring to FIG. 3C, the strength with which items are associated with the spelling "401-k" is much lower than the other spellings of that item, which may lead to the determination that "401-k" is not as suitable for use in a search query as the other spellings. The determination of whether items are strongly associated with a spelling may be based on a set of values. In one embodiment, there is a threshold value, above which items are considered to be strongly associated with the spelling of the term, wherein the spelling is considered suitable for use in a search query.

If it is determined that the second spelling is strongly associated with its associated items, whereas the first spelling is not strongly associated with its associated items, then control passes to 210. In step 210, the determination is that the second spelling is more suitable for use in a search query than the first spelling of the term.

For example, referring to FIG. 4A and FIG. 4B, consider the case in which the first spelling is "Britny Spears" and the second spelling is "Britney Spears." First note the there is a strong overlap between the items associated with each spelling. Next, note that the strength of association between "Britney Spears" and its associated items is stronger than the strength of association between "Britny Spears" and its associated items. The stronger association suggests that "Britney Spears" is a correct spelling and that "Britny Spears" is an incorrect spelling.

In one embodiment, a set of rules is used to determine a value that represents the strength of association between items and a spelling. If the value is greater than a threshold, the spelling is considered to be a suitable item for use in a search query. If the value is less than another threshold, the spelling is considered to not be suitable. The two thresholds may be the same or different.

In the event that the strength of association between the second spelling and its items is not considered strong, then no determination is made regarding the relative suitability of the spellings for use in search queries, in Step 212. In this case, the first spelling may be used to provide results.

Determining a List of Associated Items

In one embodiment, items associated with the spelling of a term are derived from an analysis of web pages. For example, the term "retirement" may frequently follow the term "401 (k)" on a web page. Thus, the term retirement is determined to be associated with 401(k). The number of times that "retirement" appears following "401(k)" on a set of web pages is recorded in a file for use as a factor in determining the strength of the association. Other terms associated with "401(k)" are also recorded. In this manner a list of terms is associated with "401(k)," along with information upon which a strength of association may be based.

In one embodiment, the associated items are derived from an analysis of search queries. In this embodiment, search queries that are entered by users are stored in a file for analysis. For example, if the term "retirement" frequently follows the term "401(k)" in a search query, then it may be associated with "401(k).

For both the analysis based on web pages and search queries, it is not required that the associated item directly follow the first term in order to be an associated item. Thus, there may be intervening terms on the web page or search query between the first term and the associated item. Nor is it required that an item follow the first term to be associated therewith. Thus, an item that precedes the first term may be associated therewith. Moreover, the list of associated items may be based on data other than web pages and search queries. For example, the analysis may be based on an electronic document that is not a web page.

When the user either accepts or rejects an alternative spelling, that acceptance or rejection may be recorded for future use. A record may be made of the acceptance or rejection of the alternative spelling relative to the particular spelling to which the alternative spelling was suggested as an alternative, and/or relative to one or more of the other words or phrases that were entered in the search request. The frequency with which an alternative spelling is accepted or rejected may be a good indicator how strong the association is between terms in the spelling suggestion and the term being corrected.

In another embodiment, the associated items are determined based on an analysis of re-formulated search queries. For example, a user may enter a first query of, "Silconi Valley," followed by a re-formulated user submission of "Silicon Valley." This may suggest that "Silconi" is somehow associated with "Valley" and that "Silicon" is somehow associated with "Valley." Moreover, it may be inferred that the association in the re-formulated search query is a stronger association than the original formulation. That is, an inference is made that the original association of "Silconi Valley" is a weak association, as it appears that the user did not intend to associate those two terms. Thus, the strength of association is based on information that is not limited to the frequency with which the terms appear near each other in search queries.

In one embodiment, the associated items are derived from units or concept networks. A unit is a group of terms that appear together as a single concept. For example, "New York City" is a unit. "New York" is another example of a unit. Units are described in U.S. Published Patent Application 2004/0199498 to Kapur et al., entitled "Systems and Methods for Generating Concept Units from Search Queries," filed Nov. 12, 2003, which is incorporated herein for all purposes. A concept network is a network of terms that form units. For example, a concept network may have a node for "New York City" coupled to separate nodes for "Hotel" "Subway" and "Museum." Thus, the term "New York City" is associated with items "Hotel" "Subway" and Museum."Concept networks are described in U.S. Published Patent Application 2005/0080795 to Kapur et al., entitled "Systems and Methods for Search Processing Using Superunits," filed Mar. 9, 2004, which is incorporated herein for all purposes.

The strength of association may be based on other factors such as the relevance of the web page that contains the spelling of the term and its associated item. For example, a page's relevance score may be based on how many words, from the search request, are contained in the page, and/or how frequently those words occur in the page. A page's relevance score may also take into account some "page quality metrics" like a citation index, the authoritativeness of the page source, etc. A page's relevance may also be defined relative to the user who submitted the query. For example, relevance may be based on the language used to submit the query (e.g., English or French). For another example, relevance may be based on properties of the user (e.g., the user's geographic region, gender, or social group). Thus, relevance scores for pages that result from query submitted by a user in the United Kingdom may be determined differently than relevance scores for pages that result from the same query submitted by a user in the United States. A search engine may compare the relevance scores of one or more pages that would result from a search request that contains the particular spelling with relevance scores of one or more pages that would result from a search request that contains the alternative spelling instead of the particular spelling.

Storing the Relative Suitability of the Spellings as Search Terms for Input to Search Tools The relative suitabilities of spellings are stored such that any tool that depends upon the spelling of terms can be improved by input of the stored results, in accordance with an embodiment of the present invention. Any tool that analyzes search queries, web pages, or electronic documents based on spelling of words can be improved by inputting the relative suitability of alternative spellings.

For example, a spelling suggestion tool can be improved based on the relative suitability of different spellings of a term and the context in which the term is used. For example, the term "Silicone" may be suitable in some contexts, but unsuitable when paired with "Valley." An alternative search query tool can be improved by adding alternative search suggestions learned by determining relative suitability of spellings. For example, the terms "401(k)" and "401 k" can each be stored as alternative search terms for the other. Yet another tool that may be improved by knowing relative suitability of different spellings of a term is a tool that generates a network of conceptually related terms, as described in U.S. published patent application 2005/0080795.

Implementation Details—Hardware Overview

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions. Tables illustrated in FIG. 3A, FIG. 3B, FIG. 3C, FIG. 4A, FIG. 4B, FIG. 5A, and FIG. 5B may be stored in one or more of the memory units of computer system 600.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. For example, processes described in FIG. 1 and FIG. 2 may be implemented on computer system 600. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
   receiving a search query that includes a first spelling of a term;
   generating a second spelling of the term;
   accessing a first set of items that are associated with the first spelling of the term;
   accessing a second set of items that are associated with the second spelling of the term;
   performing a comparison between the first set to the second set at least in part by determining a degree to which items in the first set overlap with items in the second set;
   determining how to respond to the search query based, at least in part, on the comparison;
   determining a relative ranking of the items in the first set of items, indicating how strongly a particular item in the first set is associated with a user-provided spelling of the term as compared to the remainder of the items in the first set;
   determining a relative ranking of the items in the second set of items, indicating how strongly a particular item in the second set is associated with an alternative spelling of the term as compared to the remainder of the items in the second set;

identifying a plurality of overlap items that are included in both the first set of items and the second set of items;

increasing a degree to which the items in the first set correlate to items in the second set based on a determination that a first item in the plurality of overlap items has a relative ranking above a first threshold; and decreasing the degree to which the items in the first set correlate to items in the second set based on a determination that a second item in the plurality of overlap items has a relative ranking below a second threshold;

wherein the steps are performed by one or more computing devices.

2. A method as recited in claim 1, wherein determining how to respond includes determining that a response to the search query is to include a spelling change suggestion related to the second spelling.

3. A method as recited in claim 1, wherein determining how to respond includes determining that a response to the search query is no spelling change suggestion.

4. A method as recited in claim 1, wherein determining how to respond includes determining that a response to the search query is an also try suggestion based on the second spelling.

5. A method as recited in claim 1, wherein determining how to respond includes determining that a response to the search query is to include first search results that are relevant to a search query that includes the second spelling of the term, but omits search results that are derived directly from the first spelling of the term.

6. A method as recited in claim 1, wherein determining how to respond includes determining that a response to the search query is to include search results that are relevant to a search query that includes the first spelling of the term, but omits search results that are derived directly from the second spelling of the term.

7. A method as recited in claim 1, wherein determining how to respond includes determining that a response to the search query is to include first search results that are relevant to a search query that includes the first spelling of the term and second search results that are relevant to a search query that includes the second spelling of the term.

8. A method as recited in claim 1, wherein performing a comparison comprises determining a degree to which the items in the first set correlate to items in the second set.

9. A method as recited in claim 8, wherein performing a comparison further comprises comparing a first strength with which the first set of items are associated with the first spelling of the term with a second strength with which the second set of items are associated with the second spelling of the term.

10. A method as recited in claim 9, wherein the first strength is based on a frequency with which items in the first set are associated with the first spelling of the term and the second strength is based on a frequency with which items in the second set are associated with the second spelling of the term.

11. A method as recited in claim 1, wherein performing a comparison comprises comparing a first strength with which the first set of items are associated with the first spelling of the term with a second strength with which the second set of items are associated with the second spelling of the term.

12. A method as recited in claim 1, further comprising forming the first set of items based on a frequency with which items on web pages are associated on the web pages with the first spelling of the term.

13. A method as recited in claim 1, further comprising forming the first set of items based on a frequency with which items are associated with the first spelling of the term in search queries.

14. A method as recited in claim 1, further comprising instructions for forming the first set of items based on a group of items that appear together in a file as a single concept.

15. A method as recited in claim 1, further comprising generating the first set of items and the second set of items by:
for each item in the first and second set of items:
identifying an item that is associated with a first spelling of the term in a first search query and a re-formulation of the term in a second search query;
associating the item with the first spelling in the first set;
associating the item with the re-formulation of the term in the second set; and
assigning a stronger association between the item and the re-formulation of the term than the association between the item and the first spelling of the term.

16. A method as recited in claim 1, further comprising:
storing results of the determining how to respond to the search query; and
inputting the results into a tool that depends on spelling of terms.

17. A method as recited in claim 16, wherein the tool is a spelling suggestion tool.

18. A method as recited in claim 1, wherein the second set of items does not include one or more terms of the search query.

19. A computer-readable storage that stores instructions which, when executed by one or more processors, cause the one of more processors to perform the steps of:
receiving a search query that includes a first spelling of a term;
generating a second spelling of the term;
accessing a first set of items that are associated with the first spelling of the term;
accessing a second set of items that are associated with the second spelling of the term;
performing a comparison between the first set to the second set at least in part by determining a degree to which items in the first set overlap with items in the second set;
determining how to respond to the search query based, at least in part, on the comparison;
determining a relative ranking of the items in the first set of items, indicating how strongly a particular item in the first set is associated with a user-provided spelling of the term as compared to the remainder of the items in the first set;
determining a relative ranking of the items in the second set of items, indicating how strongly a particular item in the second set is associated with an alternative spelling of the term as compared to the remainder of the items in the second set;
identifying a plurality of overlap items that are included in both the first set of items and the second set of items;
increasing a degree to which the items in the first set correlate to items in the second set based on a determination that a first item in the plurality of overlap items has a relative ranking above a first threshold; and
decreasing the degree to which the items in the first set correlate to items in the second set based on a determination that a second item in the plurality of overlap items has a relative ranking below a second threshold.

20. The computer-readable storage of claim 19, wherein determining how to respond includes determining that a response to the search query is to include a spelling change suggestion related to the second spelling.

21. The computer-readable storage of claim 19, wherein determining how to respond includes determining that a response to the search query is no spelling change suggestion.

22. The computer-readable storage of claim 19, wherein determining how to respond includes determining that a response to the search query is an also try suggestion based on the second spelling.

23. The computer-readable storage of claim 19, wherein determining how to respond includes determining that a response to the search query is to include first search results that are relevant to a search query that includes the second spelling of the term, but omits search results that are derived directly from the first spelling of the term.

24. The computer-readable storage of claim 19, wherein determining how to respond includes determining that a response to the search query is to include search results that are relevant to a search query that includes the first spelling of the term, but omits search results that are derived directly from the second spelling of the term.

25. The computer-readable storage of claim 19, wherein determining how to respond includes determining that a response to the search query is to include first search results that are relevant to a search query that includes the first spelling of the term and second search results that are relevant to a search query that includes the second spelling of the term.

26. The computer-readable storage of claim 19, wherein performing a comparison comprises determining a degree to which the items in the first set correlate to items in the second set.

27. The computer-readable storage of claim 19, wherein performing a comparison comprises comparing a first strength with which the first set of items are associated with the first spelling of the term with a second strength with which the second set of items are associated with the second spelling of the term.

28. The computer-readable storage of claim 19, wherein the steps further comprise forming the first set of items based on a frequency with which items on web pages are associated on the web pages with the first spelling of the term.

29. The computer-readable storage of claim 19, wherein the steps further comprise forming the first set of items based on a frequency with which items are associated with the first spelling of the term in search queries.

30. The computer-readable storage of claim 19, wherein the steps further comprise instructions for forming the first set of items based on a group of items that appear together in a file as a single concept.

31. The computer-readable storage of claim 19, wherein the steps further comprise generating the first set of items and the second set of items by:
   for each item in the first and second set of items:
      identifying an item that is associated with a first spelling of the term in a first search query and a re-formulation of the term in a second search query;
      associating the item with the first spelling in the first set;
      associating the item with the re-formulation of the term in the second set; and
      assigning a stronger association between the item and the re-formulation of the term than the association between the item and the first spelling of the term.

32. The computer-readable storage of claim 19, wherein the steps further comprise:
   storing results of the determining how to respond to the search query; and
   inputting the results into a tool that depends on spelling of terms.

* * * * *